United States Patent
Mesnard et al.

(10) Patent No.: US 9,804,011 B2
(45) Date of Patent: Oct. 31, 2017

(54) FLOW MEASUREMENT PROBE WITH PITOT TUBE AND THERMAL FLOW MEASUREMENT

(71) Applicant: Dieterich Standard, Inc., Boulder, CO (US)

(72) Inventors: David Russell Mesnard, Boulder, CO (US); Gregory Robert Strom, Boulder, CO (US); Nathaniel Kirk Kenyon, Boulder, CO (US)

(73) Assignee: Dieterich Standard, Inc., Boulder, CO (US)

( * ) Notice: Subject to any disclaimer, the term of this patent is extended or adjusted under 35 U.S.C. 154(b) by 222 days.

(21) Appl. No.: 14/501,571

(22) Filed: Sep. 30, 2014

(65) Prior Publication Data
US 2016/0091355 A1    Mar. 31, 2016

(51) Int. Cl.
| | |
|---|---|
| *G01F 1/684* | (2006.01) |
| *G01F 1/68* | (2006.01) |
| *G01F 1/696* | (2006.01) |
| *G01F 1/698* | (2006.01) |
| *G01F 7/00* | (2006.01) |

(Continued)

(52) U.S. Cl.
CPC ............. *G01F 7/005* (2013.01); *G01F 1/46* (2013.01); *G01F 1/68* (2013.01); *G01F 1/6842* (2013.01); *G01F 1/69* (2013.01); *G01F 1/696* (2013.01); *G01F 1/698* (2013.01); *G01F 7/00* (2013.01);
(Continued)

(58) Field of Classification Search
CPC ... G01F 1/46; G01F 1/68; G01F 1/684; G01F 1/69; G01P 5/165
See application file for complete search history.

(56) References Cited

U.S. PATENT DOCUMENTS

| | | | |
|---|---|---|---|
| 3,785,206 A | 1/1974 | Benson et al. | |
| 4,959,990 A * | 10/1990 | Morris | G01F 1/46 |
| | | | 73/1.29 |

(Continued)

FOREIGN PATENT DOCUMENTS

| | | |
|---|---|---|
| EP | 0425120 A2 | 5/1991 |
| EP | 2312276 A1 | 4/2011 |
| JP | 2002188943 A | 7/2002 |

OTHER PUBLICATIONS

Office Action from Chinese Patent Application No. CN201520060320.6, dated Apr. 23, 2015.

(Continued)

*Primary Examiner* — Daniel J Colilla
(74) *Attorney, Agent, or Firm* — Westman, Champlin & Koehler, P.A.

(57) ABSTRACT

A flow measurement probe includes an elongate probe having an averaging pitot tube with a plurality of upstream and downstream openings arranged along a length of the elongate probe, and a thermal flow measurement sensor coupled to the elongate probe. A method of measuring fluid flow rate in a process includes calculating a flow rate of the fluid using differential pressure in upstream and downstream openings of an averaging pitot tube in an elongate probe when the differential pressure is at least a defined measurement threshold, and calculating the flow rate of the fluid with a thermal mass flow sensor coupled to the flow measurement probe when the differential pressure is less than the defined measurement threshold.

27 Claims, 6 Drawing Sheets

(51) Int. Cl.
    *G01P 5/165*     (2006.01)
    *G01F 1/46*     (2006.01)
    *G01F 25/00*     (2006.01)
    *G01F 1/69*     (2006.01)

(52) U.S. Cl.
    CPC .......... *G01F 25/0007* (2013.01); *G01P 5/165* (2013.01)

(56) References Cited

U.S. PATENT DOCUMENTS

| | | | | |
|---|---|---|---|---|
| 5,123,288 | A * | 6/1992 | Tench | G01P 5/165 73/202.5 |
| 2002/0046612 | A1 * | 4/2002 | Mudd | G01F 1/40 73/861.52 |
| 2003/0145661 | A1 * | 8/2003 | Taranto | G01F 1/46 73/861.65 |
| 2005/0034535 | A1 * | 2/2005 | Sprague | G01F 1/3209 73/861.22 |
| 2009/0139348 | A1 | 6/2009 | Speldrich | |
| 2011/0125424 | A1 * | 5/2011 | Han | G01F 1/32 702/47 |
| 2015/0276441 | A1 * | 10/2015 | Kraige et al. | G01F 1/46 73/861.42 |

OTHER PUBLICATIONS

The International Search Report and the Written Opinion of the International Searching Authority dated Dec. 4, 2015 for the corresponding PCT Application No. PCT/US2015/049342 filed on Sep. 10, 2015.
Communication pursuant to Rules 161(1) and 162 EPC from European Patent Application No. 15767026.6, dated May 10, 2017.

* cited by examiner

FLOW MEASUREMENT PROBE WITH PITOT TUBE AND THERMAL FLOW MEASUREMENT

BACKGROUND

The present disclosure relates to measurement of flow of a process fluid in an industrial process. More specifically, the present disclosure relates to measuring a flow rate with an averaging pitot tube and thermal mass sensor.

Flare gas flow measurement is important for a number of reasons including mass balance, energy conservation, emissions monitoring, and regulatory considerations. For example, natural gas is commonly associated with petroleum deposits. Gas may be released from petroleum deposits during petroleum extraction. Systems which are used to release natural gas generally operate at relatively low flow rates (purge flow conditions), but also may experience unpredictable conditions with relatively high flow rates (upset conditions). An averaging pitot tube primary element (APT) (such as the Annubar® APT available from Emerson Process Management which is suitable for measuring flow rates in upset conditions may be unable to generate a measurable differential pressure (DP) signal during purge flow conditions. Thermal mass flow sensors may be used to measure flow rates in purge flow conditions are unable to generate accurate flow rate readings during upset conditions. Measurement of flow rates may be made using ultrasonic instruments, but such instruments are typically expensive.

Natural gas is often burned at its extraction site to mitigate environmental impact and to promote worker safety. An estimated 150 billion cubic meters of gas are burned annually in flare systems. Oil and gas operators are required to monitor and report the amount of gas flared annually. To accurately report the amount of gas flared, flare metering applications typically target an uncertainty of +/−5% of mass flow rate of the gas that is flared.

The discussion above is merely provided for general background information and is not intended to be used as an aid in determining the scope of the claimed subject matter. The claimed subject matter is not limited to implementations that solve any or all disadvantages noted in the background.

SUMMARY

A flow measurement probe is provided. The flow measurement probe includes an elongate probe having an averaging pitot tube with a plurality of upstream and downstream openings. A thermal flow measurement sensor is coupled to the elongate probe.

A method of measuring fluid flow rate in a process is also provided. The method includes measuring a differential pressure of the fluid with upstream and downstream openings in an elongate probe of an averaging pitot tube. Data related to flow rate is also collected using a thermal flow rate sensor. An output is provided based upon differential pressure and thermal flow rate. A process variable transmitter is also provided.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

DETAILED DESCRIPTION

Figure 1:
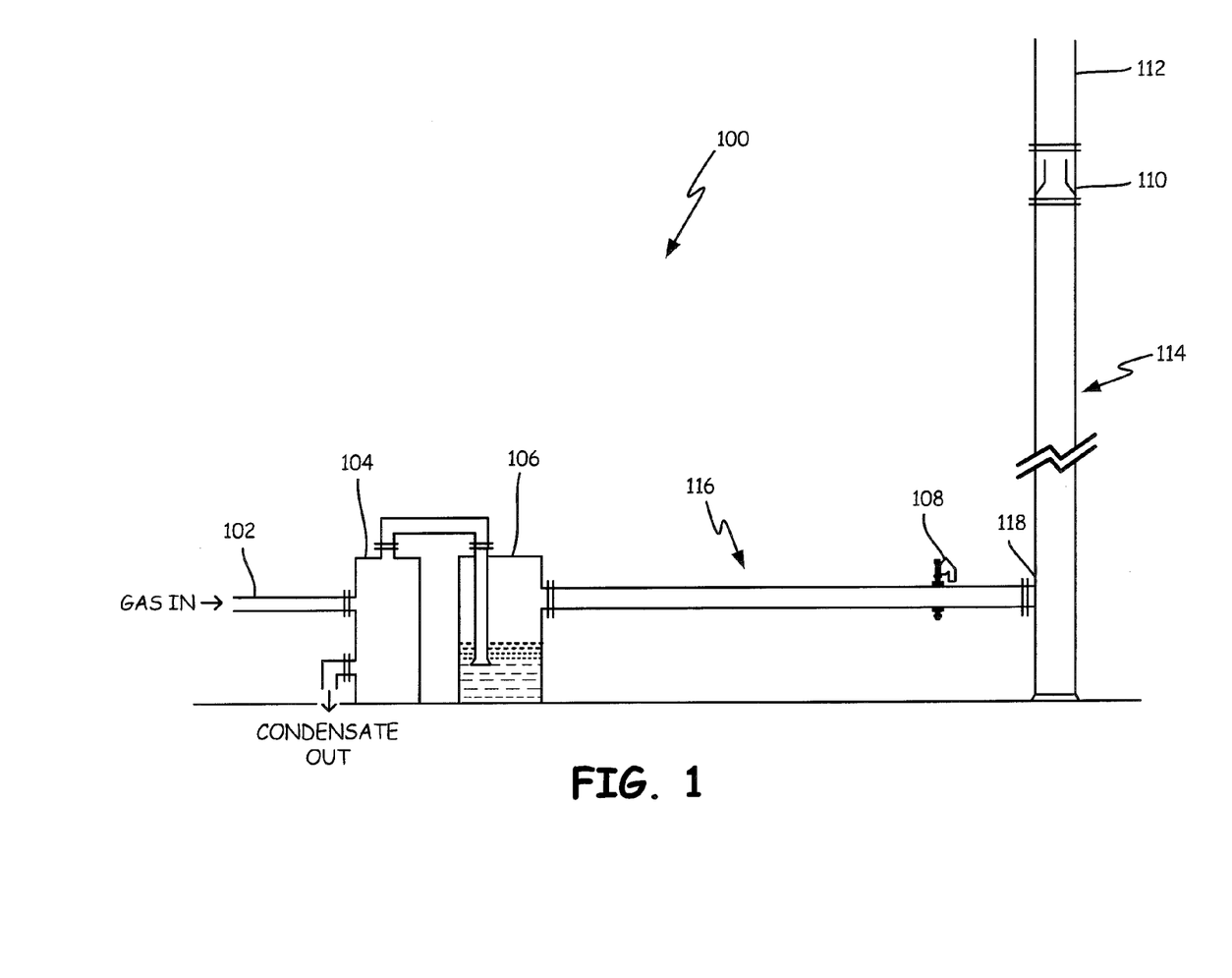
FIG. 1 is a diagram of a typical natural gas flare system according to an embodiment of the present disclosure.

A typical natural gas flare system is shown in FIG. 1. Flare system 100 comprises a gas collection header 102 to channel waste gas from an extraction location to a disposal point, a knock out drum 104 to remove a majority of condensate from the waste gas flow stream, a liquid seal 106 to prevent natural gas backflow from a flare stack, a flow measurement system 108 to measure waste gas stream mass flow for mass balance and regulatory considerations, a seal barrier 110 to prevent air backflow into flare stack 114, and a flare tip 112 to ensure complete combustion of waste gas. The seal barrier 110 and flare tip 112 are within the stack 114 which transitions from a pipe system 116 leading from the liquid seal 106 through the flare flow measurement system 108 before transitioning at transition point 118 to the flare stack 114. In one embodiment, the flare stack 114 is substantially vertical. Flow measurement systems such as those described below are amenable to use with a natural gas flare system such as system 100. Alternatively, the device could be applied to any liquid or gas flow measurement requiring extreme turndown.

Gas systems such as natural gas disposal systems typically operate in two modes, normal operation and upset operation. In normal operation, a system, such as a flare system, constantly emits waste gas at a low flow rate known as purge flow. Purge flow operation is typically at pressures slightly above atmospheric pressure (e.g., 0.5 pounds per square inch gauge (psig)), and flow velocities typically lower than 20 feet per second. Ambient temperatures have some effect on purge flow. In petroleum production, unpredictable events referred to as upset events can result in a release of large quantities of waste gas to be disposed, at high flow rates, pressures, and temperatures. Under upset operation, pressures of waste gas can exceed 60 psig, temperatures can exceed 500° F., and flow velocities can reach 600 feet per second.

Flow rate measurement devices such as averaging pitot tubes can be used for measurements in an upset condition, due in part to their rugged construction, proven accuracy, fast time response, and low permanent pressure loss. However, averaging pitot tube elements provide only a relatively minor restriction within the flow stream of a flare stack, and therefore have difficulty inducing sufficient differential pressure signals to make accurate flow measurement possible during normal operation under purge flow. Since low flow rate operation is nearly constant, cumulative mass flow even for normal operation can be significant, and cannot be ignored.

Figure 2A:
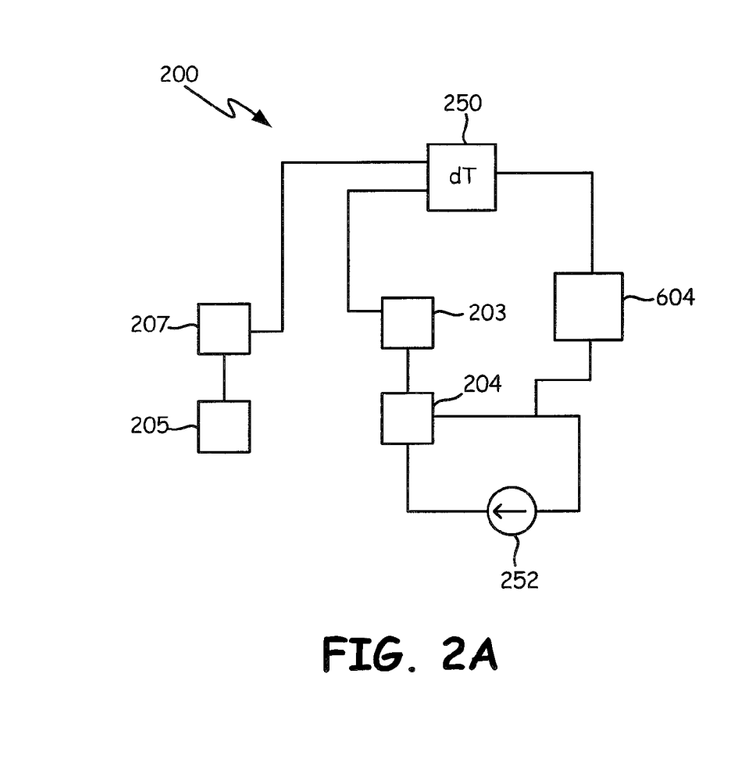
FIG. 2A is a schematic diagram of thermal mass flow sensor circuitry.
Figure 2B:
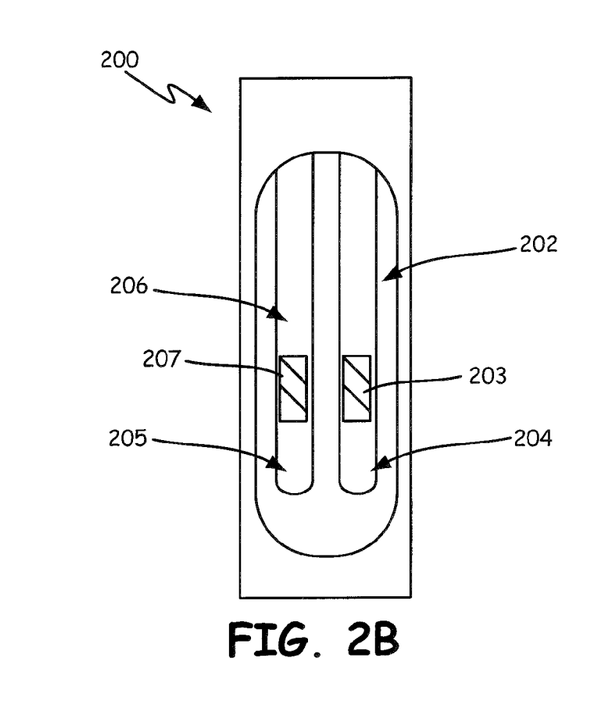
FIG. 2B is a plan view of a thermal mass flow sensor.

Thermal mass flowmeters can be used as a reliable flow measurement option for normal operation such as purge flow. A block diagram of a typical thermal mass flowmeter sensor 200 is shown in FIG. 2A and a plan view is shown in FIG. 2B. Thermal mass flowmeter sensor 200 operates on the principle of thermal convection or dispersion, and comprises two temperature sensors 202, 206 exposed within a flow stream. One of the temperature sensors 202 typically uses a resistance temperature detector 203 and a resistive heating element 204. The second temperature sensor 206 is a reference sensor that measures ambient temperature of the flow using resistive temperature detector 207, and has a mass balancing element 205 to balance the mass of the resistive heating element 204. For the first sensor 202, flow passing by the element removes energy from the heated element through convection, as calculated by Fourier's Law.

$$q = h_c A\, dT$$

Where:
q=heat transfer per unit time
A=area of the heat transfer surface
$h_c$=convective heat transfer coefficient
dT=temperature difference between the heat transfer surface and the fluid Thermal mass flowmeters commonly measure the energy removed from the flowmeter in one of two ways. The first uses a constant current driven through the heater element 204. The difference in temperature between the ambient sensor 206 and the heated sensor 202 is a measure of thermal energy loss in the instrument 200. The second uses constant temperature. A feedback loop controls the current applied to the heated sensor 202 so as to maintain a constant temperature difference between the ambient sensor 206 and the heated sensor 204. The current required to maintain the constant temperature difference is proportional to the thermal energy loss to the flow stream in the instrument 200.

FIG. 2A shows a schematic of a thermal mass flow sensor 200. Resistance temperature detectors 207 and 203 are connected to differential temperature monitor 250, which detects a temperature differential between detectors 207 and 203. Resistive heating element is connected to a current source 252 which drives a current determined by mass flow electronics 604, described further below. Thermal mass flow electronics monitor and control current provided by current source 252 in the constant current and constant temperature operational modes of thermal mass flow sensor 200.

A thermal mass flowmeter is well suited for the measurement of flow rate under relatively steady state low flow rate conditions. It can therefore accurately measure purge flow. However, in upset conditions, a thermal mass flowmeter does not function nearly as well. Thermal mass flowmeters are not generally accurate in situations involving entrained liquids. Fluid displaced from a backflow preventer such as backflow preventer 106 and the presence of liquid hydrocarbons within a waste gas stream adversely impact thermal mass based flow measurement accuracy during upset conditions. Flow correction coefficients for operation with different gases are not well understood and of questionable reliability.

Thermal mass flowmeters occasionally need to be removed from service for calibration recertification. However, it is typically unacceptable for safety related systems such as gas flow measurement devices to be out of service. Thermal mass measurement systems have significant sensitivity to variations in gas composition, and such variations are common in upset conditions. Upset conditions also tend to change ambient temperature conditions, increasing reliability issues with thermal mass flowmeters.

Figure 3:
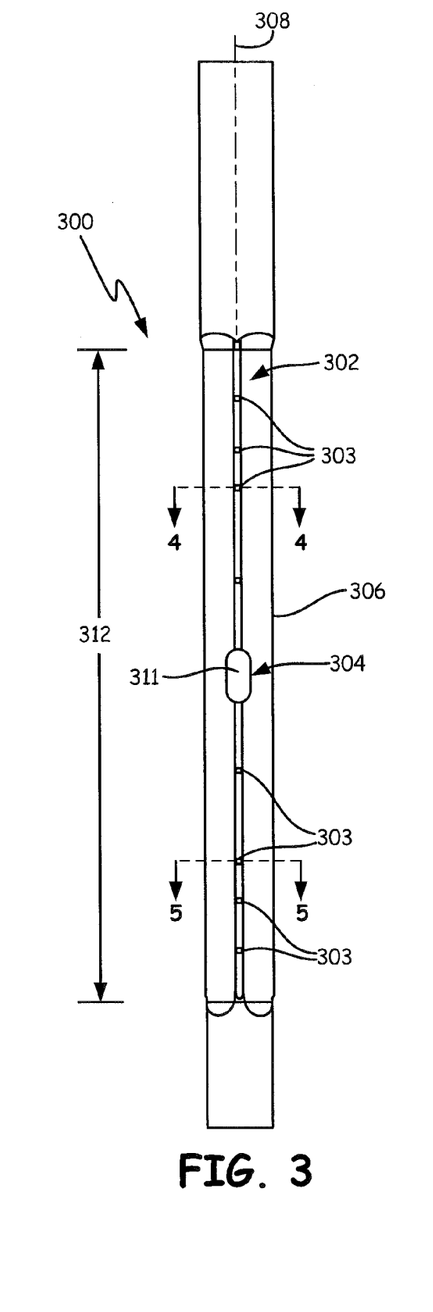
FIG. 3 is a front elevation view of an averaging pitot tube according to an embodiment of the present disclosure.

A flow measurement probe 300 according to one embodiment of the present disclosure is shown in FIG. 3. Flow measurement probe 300 comprises averaging pitot tube element 302 having a plurality of individual upstream high pressure openings (e.g., impact tubes) and low pressure downstream openings (e.g., impact tubes) 303 opposite each other aligned with a flow stream, and a thermal flow measurement sensor 304. The averaging pitot tube element 302 and the thermal mass flow sensor 304 are disposed in an elongate probe body 306. A differential pressure is created between the upstream and downstream openings as the flow moves past the probe body 306.

As can be seen in FIG. 3, in one embodiment the averaging pitot tube element 302 and the thermal flow measurement sensor 304 are arranged in an elongate probe body 306 having a longitudinal axis 308. Sensor 304 is positioned in cavity 311 which extends through the body 306 and allows fluid flow therethrough. The plurality of upstream openings 303 of the averaging pitot tube element 302 are distributed along the length of the elongate probe 306 in the direction of longitudinal axis 308. This allows an average of the pressure across a cross section of piping to be developed in impulse piping. In one embodiment, the thermal flow measurement sensor 304 is located substantially centrally in the elongate probe 306, that is, approximately equidistant from opposite edge walls of a conduit through which the fluid for the which flow rate is to be measured flows. In one embodiment, the openings 303 of the averaging pitot tube element 302 are on either side of the thermal mass flow sensor 304 along the length of the elongate probe 306 along the longitudinal axis 308.

In a thermal mass sensor 304, the two sensor elements 202, 206 (see FIG. 2) are generally oriented in the cross sectional plane of the conduit (e.g., pipe) in which they are installed. Sensor elements 202, 206 are positioned in cavity 311 of sensor 304 as shown in FIG. 3. Sensor elements 202, 206, which also carry electrical wiring, are mounted in bores 310 shown in FIG. 4. The internal averaging pitot tube impulse tubes 309 (FIGS. 4 and 5) associated with the openings 303 of the averaging pitot tube element 302 are positioned in one embodiment so as to straddle the thermal mass flow sensor 304, allowing for pressure to be obtained at the multiple individual openings 303 of the averaging pitot tube element 302 for the averaging of flow rate readings. In one embodiment, the averaging pitot tube element 302 comprises distinct sections connected via tubing for pressure communication at the thermal mass flow sensor 304.

The elongate probe 306 in one embodiment has a height 312 as shown in FIG. 3. This height 312 is determined according to a diameter of a conduit into which the flow measurement probe 300 is placed. As thermal mass flow sensors, such as sensor 304, typically have one or only a few measuring sensors, to ensure accuracy, their location within a flow stream is important. In a conduit, if the location of a thermal mass flow sensor is too near the edge of the conduit, the flow profile of fluid within the conduit may be such that an accurate flow rate reading is not possible. As can be seen in FIG. 3, the position of the thermal mass flow sensor 304 in one embodiment is at or near the middle of the elongate probe 306 of the flow measurement probe 300 along its height 312. This placement positions the thermal mass flow sensor 304 such that when the flow measurement probe 300 is installed in a conduit, the thermal mass flow sensor 304 is positioned at the center of the conduit for accurate measurements, without requiring additional measurement and determination of proper positioning.

In another embodiment, the thermal mass sensor 304 may be a pair or an array of thermal mass flow sensors, comprising two thermal mass sensors, or an array of thermal mass sensors, in a single cavity such as cavity 311, and the flow rates for the pair or array of thermal mass flow sensors may be averaged to provide a potentially more accurate measurement of the flow rate during purge flow conditions. The thermal mass sensor 304 or a pair or array of thermal mass sensors such as those described are in one embodiment isolated from the upstream and downstream openings 303 of the averaging pitot tube element 302.

Figure 4:
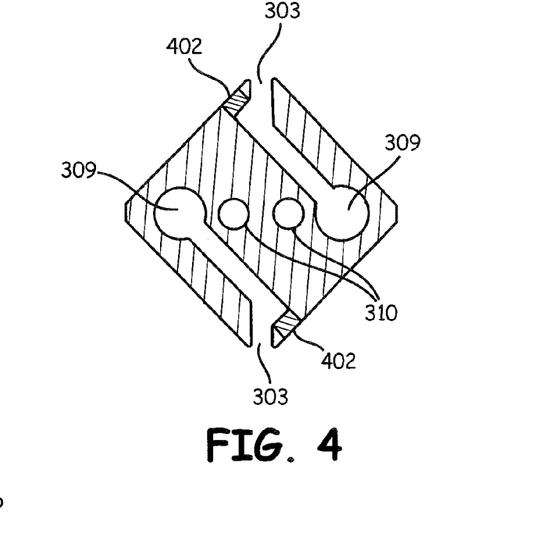
FIGS. 4 and 5 show cross sections along lines 4-4 and 5-5, respectively, of FIG. 3.
Figure 5:
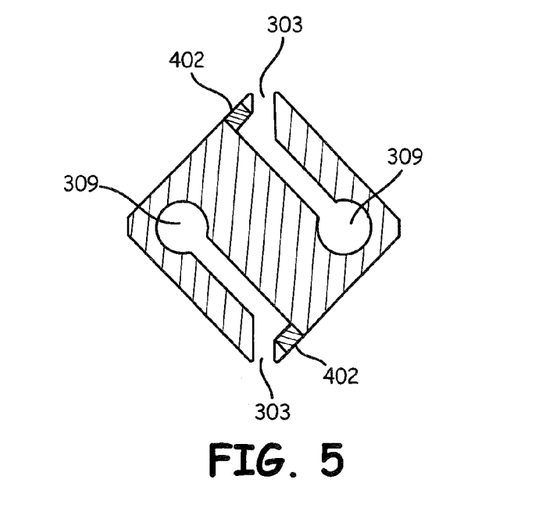

As shown in greater detail in FIGS. 4 and 5, the upstream and downstream openings 303 of the averaging pitot tube element 302 may be formed by cross drilling. In one embodiment, plugs 402 are welded into cross drilled tubes that are not aligned with the fluid flow, to ensure proper impact tube alignment with the flow stream. FIGS. 4 and 5 show cross sections along lines 4-4 and 5-5, respectively, of FIG. 3, FIG. 4 showing also conduits 310 for thermal wiring from thermal mass flow sensor 304. The upstream and downstream openings 303 and their associated impulse tubes in one embodiment straddle the thermal mass flow sensor 304 chamber.

Figure 6:
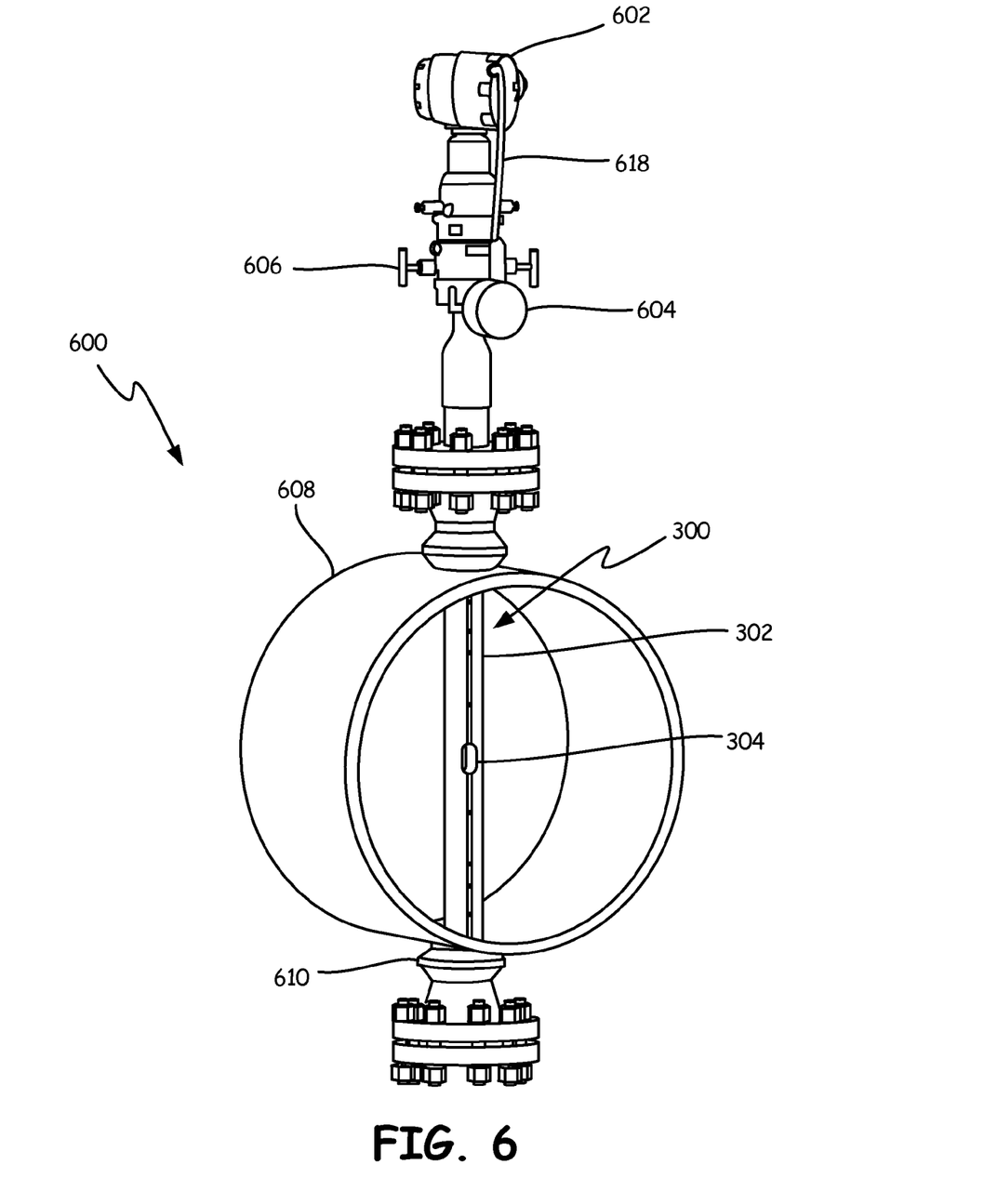
FIG. 6 is a perspective view of a gas flow measurement system according to an embodiment of the present disclosure.

In one embodiment of the present disclosure, a gas flow measurement system 600 is provided as shown in FIG. 6. System 600 comprises a flow measurement probe such as flow measurement probe 300, described herein, having an elongate probe with each of an averaging pitot tube element 302 combined with a thermal mass flow sensor 304. The thermal mass flow sensor 304 provides accurate measurement in a normal purge flow condition of the system 600, and the averaging pitot tube element 302 provides accurate flow measurements in upset conditions of the system 600. In one embodiment, outputs of the averaging pitot tube element 302 and the thermal mass flow sensor 304 covering an entire flow range are combined into a single signal indicating the flow rate. In one embodiment, this is accomplished with a transmitter 602 connected to receive flow information from thermal mass electronics 604 coupled to sensor 304 and differential pressure measurement system electronics 606 connected to the pitot tube element 302. Alternatively, a terminal block and electronics stack may be used to manage the outputs from the two sensors, and in one embodiment is included in a connection head to mitigate installation complexity.

To establish a single flow rate output, operational information for the sensor 304 and averaging pitot tube element 302 is used in one embodiment. Averaging pitot tube elements are typically more accurate in determining flow rates at higher velocities than thermal mass sensors. In one configuration, when the averaging pitot tube element 302 generates a measurable differential pressure, flow rate calculations from the averaging pitot tube element are used to generate the output. In an exemplary embodiment, the differential pressure developed in averaging pitot tube element 302 is used, for example, by a process variable transmitter (described below) to calculate a flow rate in the system when a differential pressure exceeds a specified differential. Readings from the thermal mass flow sensor 304 are used, for example, by a process variable transmitter to calculate a flow rate when the differential pressure is below measurable specified differential. In this embodiment, when a specified differential pressure is detected, the flow measurement system uses the averaging pitot tube element 302 to determine the flow rate. Only when a specified differential pressure is not detected is the flow rate determined by the thermal mass flow sensor 304. When the averaging pitot tube element 302 is being used to measure the flow rate, thermal mass flow sensor 304 may be used to measure temperature of the process fluid.

Transmitter software in one embodiment can be used to integrate the two sensor signals, from the averaging pitot tube element and the thermal mass flow sensor, to provide a user with a single flow rate output. This is accomplished in one embodiment by wiring thermal mass electronics contained in housing 604 signals output from the isolation manifold for differential pressure measurement 607 to a process variable transmitter 602, which can deliver a single 4-20 milliAmpere output such as provided by a two-wire control loop, and/or a digital output covering an entire flow rate range. As illustrated in FIG. 6, flow measurement probe 300 is disposed in a conduit (e.g., pipe) 608. In this configuration, it can be seen that when thermal mass flow sensor 304 is located centrally along the height of the elongate tube 306, the placement of the flow measurement probe 300 in the conduit 608 places the thermal mass flow sensor 304 at a desired position in the flow stream in conduit 608 without measurement or other placement determination. The process variable transmitter 602, described further herein with respect to FIG. 7, may use an algorithm to blend the thermal mass electronics output and the differential pressure measurement output together to form a single signal indicative of a flow rate for the entire flow range. The process variable transmitter 602 may also provide an indication as to which sensor, the averaging pitot tube element 302 or the thermal mass flow sensor 304, is being used to provide the indicated flow rate.

Housing 604 has a terminal block 614 (see FIG. 7) for thermal wiring 612 running from thermal mass flow sensor 304 through conduits 310 to the housing 604. From the terminal block 614, thermal flow electronics 616 determine thermal flow, and signals are sent along wiring 618 to process variable transmitter 602.

Direct mounting of a pressure transmitter to an averaging pitot tube element such as element 302 is in one embodiment facilitated by installing a thermal mass flow sensor such as sensor 304 through a flanged opposite side support 610 of the averaging pitot tube element 302. This flanged opposite side support 610 is in this embodiment an alternate mounting location for thermal mass flow electronics such as electronics 604.

Figure 7:
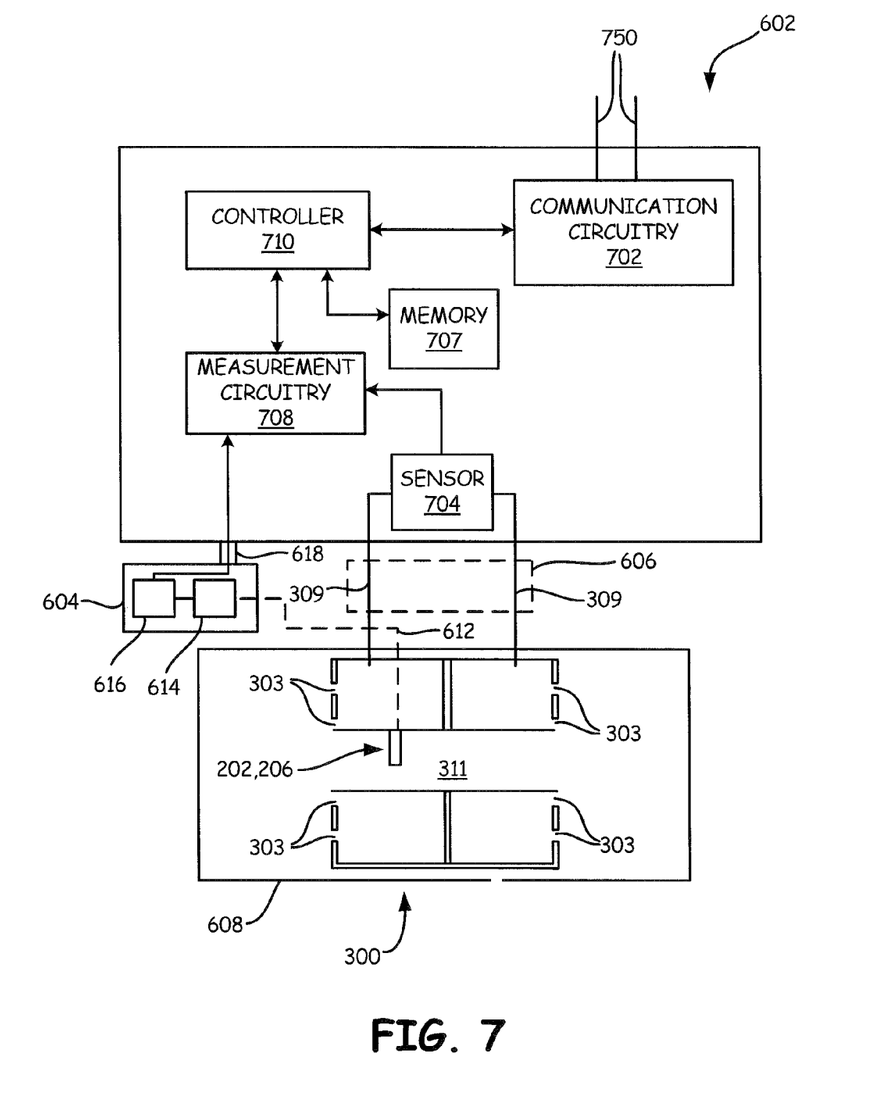
FIG. 7 is a block diagram of a transmitter according to another embodiment of the present disclosure.

FIG. 7 is a system block diagram of a transmitter 602 and flow measurement probe 300 according to one embodiment. Transmitter 602 includes a loop communication circuitry 702, pressure sensor 704, thermal mass flow electronics 604, measurement circuitry 708, and controller 710. Loop communication circuitry 702 is coupleable to a process control loop 750 and is adapted to communicate a process variable output related to a flow rate of gas in a pipe such as pipe 608, based on a combined flow rate depending on outputs of multiple sensors of a flow measurement probe such as flow measurement probe 300 described above. Loop communication circuitry 702 can include circuitry for communicating over a wired communication link and/or a wireless communication link. Such communication can be in accordance with any appropriate process industry standard protocol such as the protocols discussed above, including both wired and wireless protocols.

Typically, a field device such as transmitter 602 is located at a remote location in a process facility, and transmits a sensed process variable back to a centrally-located control room. Various techniques can be used for transmitting the process variable, including both wired and wireless communications. One common wired communication technique uses a two-wire process control loop 750 in which a single pair of wires is used to both carry information as well as provide power to the transmitter 602. One technique for transmitting information is by controlling the current level through the process control loop 750 between 4 mA and 20 mA. The value of the current within the 4-20 mA range can be mapped to corresponding values of the process variable. Example digital communication protocols include HART® (a hybrid physical layer consisting of digital communication signals superimposed on a standard 4-20 mA analog signal), FOUNDATION™ Fieldbus (an all-digital communication protocol promulgated by the Instrument Society of America in 1992), Profibus communication protocol, or others. Wireless process control loop protocols, such as radio-frequency communication techniques including WirelessHART® in accordance with the IEC 62591 standard, may also be implemented. Process control loop 750 in FIG. 7 represents either or both of wired and wireless embodiments of communication connections between transmitter 602 and a user interface.

Pressure sensor 704 includes pressure input ports coupled to averaging pitot tube element 302 through impulse piping 309. Sensor 704 can be any device that has an electrical characteristic that changes in response to changes in applied pressure. For example, sensor 704 can be a pressure sensor in which a capacitance changes in response to the differential pressure applied between input ports. Thermal mass flow electronics 604 receive data from the thermal mass flow sensor 304.

Measurement circuitry 708 is coupled to sensor 704 and electronics 604 and is configured to provide sensor outputs based on the signals to controller 710. Measurement circuitry 304 can be any electronic circuitry that can provide a suitable signal related to differential pressure. For example, measurement circuitry can be an analog-to-digital converter, a capacitance-to-digital converter or any other appropriate circuitry.

Controller 710 is coupled to measurement circuitry 708 and loop communication circuitry 702. Controller 710 is adapted to provide a process variable output to loop communication circuitry 702, which output is related to the sensor outputs provided by measurement circuitry 708. Controller 710 can be a programmable gate array device, a microprocessor, or any other appropriate device or devices. Although loop communication circuitry 702, measurement circuitry 708 and controller 710 have been described with respect to individual modules, it is contemplated that they can be combined such as on an Application Specific Integrated Circuit (ASIC). In an exemplary embodiment, memory 707 is included and is coupled to controller 710 for storage of computer readable instructions, parameter values, etc. used to configure controller 710 and/or measurement circuitry 708. In some such embodiments, configuration information for sensors such as averaging pitot tube element 302 and thermal mass flow sensor 304 is stored in memory 707.

The controller 710 is configured in one embodiment to determine a flow rate of the process flow using the input from the differential pressure sensor 704 when a differential pressure is at least a defined measurement threshold, and to determine the flow rate using the input from the thermal mass flow sensor determined by the thermal mass flow electronics 604 when the differential pressure is less than the defined measurement threshold. Inputs from the thermal mass flow sensor and the differential pressure sensor are provided in one embodiment by a flow measurement probe such as flow measurement probe 300 described above, having a thermal mass flow sensor integrated with an averaging pitot tube element in an elongate probe.

In one embodiment, the process variable transmitter is configured to switch between calculating a flow rate based on a differential pressure between the plurality of upstream and downstream openings when the differential pressure exceeds a measureable differential, and calculating a flow rate based on readings of the thermal flow measurement sensor when the differential pressure is below the measurable differential. This switching may be automatic, such as when a certain threshold is met, or may be selectable, such as by a user.

Further, some calculation of flow rate, although not as accurate, may be made using readings from either sensor if the other is unavailable. A process variable transmitter such as transmitter 700 may monitor the averaging pitot tube element and thermal mass flow measurement sensor of a flow measurement probe such as probe 300, and if one element fails, or begins to provide readings indicative of failure, the process variable transmitter may in one embodiment provide a warning of the failure or impending failure.

Figure 8:
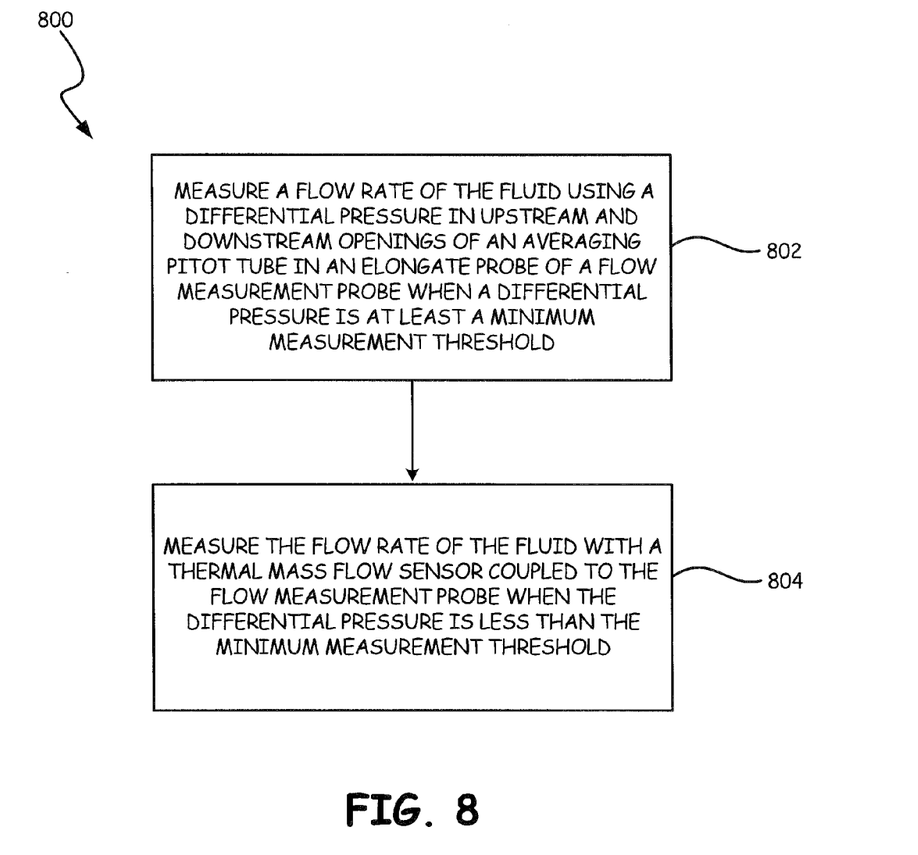
FIG. 8 is a flow chart diagram of a method according to an embodiment of the present disclosure.

A method 800 of measuring fluid flow rate in a process is shown in flow chart form in FIG. 8. Method 800 comprises in one embodiment measuring a flow rate of the fluid with a first sensor of an averaging pitot tube when a differential pressure is at least a defined measurement threshold in block 802, and measuring the flow rate of the fluid with a second sensor of the averaging pitot tube when the differential pressure is less than the defined measurement threshold in block 804. Measuring with a first sensor in one embodiment comprises measuring with pressure sensor attached to the averaging pitot tube, and measuring with a second sensor comprises measuring with a thermal mass flow sensor within the averaging pitot tube. As thermal mass flow sensors are sensitive to ambient temperature, in one embodiment, the second sensor is isolated from the first sensor to mitigate signal loss through conduction.

The time response of differential pressure flow technology such as averaging pitot tube element 302 is superior to the time response of thermal mass flow measurement technology such as sensors like sensor 304. Therefore in one embodiment the output from the averaging pitot tube element 302 is used when a measureable differential pressure magnitude is present. During measurement range overlap when each of the averaging pitot tube element 302 and thermal mass flow sensor 304 can perform a flow rate measurement, a comparison can be made between the outputs of each sensor to enable verification of the thermal mass flow sensor without downtime. As traditional thermal mass flowmeters occasionally need to be removed from service for calibration recertification, the ability to calibrate without down time makes embodiments of the present disclosure well-suited for safety related systems such as flare flow measurement systems that have strict in service requirements. Comparison in one embodiment comprises comparing output from the averaging pitot tubes 302 and the thermal mass flow sensor 304 when a flow rate is within a range of operational measurement for each of the averaging pitot tube element and the thermal mass flow sensor, and calibrating the thermal mass flow sensor using the averaging pitot tubes reading when the flow rate is within the range of measurement for each of the sensors. Comparison as has been described may also in one embodiment be used to detect a bad sensor in a diagnostic manner.

Upset events often introduce impurities into the flow stream, such as debris, entrained liquids such as hydrocarbons, varying gas composition, as well as changing flow rates and ambient temperatures. Fluid in a thermal mass flow sensor such as that displaced from a backflow preventer and the presence of liquid hydrocarbons within the flow stream can negatively affect the performance of thermal mass flow sensors. Debris can lodge in impact tube openings or impact tubes of the APT sensor. Each of these occurrences can affect operation of one or both APT and thermal mass flow sensors. In various embodiments, fluids are removed from a thermal mass flow sensor after an upset event. In various embodiments, debris is cleared from impact tube openings and/or impact tubes of an APT sensor after an upset event. Each of these operations may be done, for example, by purging a gas such as air or nitrogen through the appropriate sensor.

A flow measurement system such as those described herein is in one embodiment located at grade just upstream of a transition such as transition 118 in FIG. 1 to a vertical stack such as stack 114 in FIG. 1. This location ensures easy accessibility for service personnel. Flares are generally located in a remote location and are connected to the rest of the system by long sections of pipe. These long sections allow for a sufficiently long straight run of fluid therein to ensure a stable flow profile at the measurement point by a flare flow measurement system such as those described with respect to FIGS. 2-8.

Although elements have been shown or described as separate embodiments above, portions of each embodiment may be combined with all or part of other embodiments described above. Further, while the flow measurements described herein have referred to natural gas flow in a conduit, and the measurement of flare gas flow rates in a flare system, flow of process fluids other than natural gas is amenable to measurement using the structure and methods described herein, without departing from the scope of the disclosure.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A flow measurement system, comprising:
    a flow measurement probe comprising:
        an elongate probe comprising an averaging pitot tube element having a plurality of upstream and downstream openings arranged along a length of the elongate probe and at least one opening extending between an upstream side of the elongate probe and a downstream side of the elongate probe, the at least one opening between at least two of the plurality of upstream and downstream openings; and
        a thermal flow sensor disposed in the at least one opening and within the elongate probe; and
    a process variable transmitter coupled to the flow measurement probe, the process variable transmitter comprising:
        a microprocessor to determine a flow rate output based on inputs from each of the thermal flow sensor and a differential pressure sensor coupled to the averaging pitot tube, and by blending the inputs together to form a single signal indicative of a flow rate for a flow range covering each of a flow range of operating measurement of the differential pressure sensor and of the thermal flow sensor;
        memory coupled to the microprocessor to store transmitter configuration data; and
        an output communication element to output the flow rate output signal.

2. The flow measurement system of claim 1, wherein the thermal flow sensor is isolated from the upstream and downstream openings.

3. The flow measurement system of claim 1, wherein the thermal flow sensor comprises two thermal flow sensors in a single chamber.

4. The flow measurement system of claim 3, wherein the upstream and downstream openings comprise tubes drilled from upstream and downstream directions of a flow of fluid past the averaging pitot tube.

5. The flow measurement system of claim 1, wherein the thermal flow sensor comprises an array of thermal flow sensors disposed in the elongate tube.

6. The flow measurement system of claim 1, wherein the thermal flow sensor is disposed substantially at a center of the elongate probe along a height of the elongate probe.

7. The flow measurement system of claim 1, wherein the microprocessor is configured to determine the flow rate using a differential pressure between the plurality of upstream and downstream openings when the differential pressure exceeds a measureable differential, and wherein the process variable transmitter is configured to determine the flow rate using readings from the thermal flow sensor when the differential pressure is below the measurable differential.

8. The flow measurement system of claim 1, wherein the microprocessor is configured to switch between calculating a flow rate based on a differential pressure between the plurality of upstream and downstream openings when the differential pressure exceeds a measureable differential, and calculating a flow rate based on readings of the thermal flow sensor when the differential pressure is below the measurable differential.

9. The flow measurement system of claim 8, wherein the microprocessor is configured to switch automatically.

10. The flow measurement system of claim 8, wherein the microprocessor is selectably configured to switch.

11. The flow measurement system of claim 1, wherein the microprocessor determines a process fluid temperature using readings from the thermal flow sensor.

12. The flow measurement system of claim 1, wherein the microprocessor calibrates the thermal flow sensor using the averaging pitot tube determined flow rate when the flow rate is within the range of operating measurement for each of the averaging pitot tube and the thermal flow sensor.

13. The flow measurement system of claim 1, wherein the thermal flow sensor comprises two sensors.

14. A method of measuring fluid flow rate in a process, comprising:
    measuring a flow rate of the fluid using a differential pressure in a plurality of upstream and downstream openings of an averaging pitot tube in an elongate probe of a flow measurement probe when the differential pressure is at least a defined measurement threshold;
    measuring the flow rate of the fluid with a thermal mass flow sensor disposed within an opening in the flow measurement probe extending between an upstream side of the elongate probe and a downstream side of the elongate probe, the opening positioned between at least two of the plurality of upstream and downstream openings, when the differential pressure is less than the defined measurement threshold; and
    blending the measured flow rates together to form a single signal indicative of a flow rate for a flow range covering each of a flow range of operating measurement of the averaging pitot tube and of the thermal mass flow sensor.

15. The method of claim 14, and further comprising isolating the thermal mass flow sensor from the upstream and downstream openings.

16. The method of claim 14, and further comprising:
comparing flow rates determined by the upstream and downstream openings and the thermal mass flow sensor when a flow rate is within a range of operating measurement for each of the averaging pitot tube and the thermal mass flow sensor; and
calibrating the thermal mass flow sensor using the averaging pitot tube determined flow rate when the flow rate is within the range of operating measurement for each of the averaging pitot tube and the thermal mass flow sensor.

17. The method of claim 14, and further comprising removing fluids from the thermal mass flow sensor after an upset event.

18. The method of claim 17, wherein removing fluids from the thermal mass flow sensor comprises purging a gas through the thermal mass flow sensor.

19. The method of claim 18 wherein purging a gas comprises purging air or nitrogen through the thermal mass flow sensor.

20. The method of claim 14, and further comprising clearing any debris from the upstream and downstream openings after an upset event.

21. The method of claim 20, wherein clearing debris comprises purging a gas through the upstream and downstream openings.

22. The method of claim 14, and further comprising measuring a process fluid temperature using the thermal mass flow sensor.

23. The method of claim 14, wherein the upstream and downstream openings and the thermal mass flow sensor are disposed in a single elongate probe of the averaging pitot tube.

24. The method of claim 14, and further comprising switching between calculating a flow rate based on a differential pressure between the plurality of upstream and downstream openings when the differential pressure exceeds a measureable differential, and calculating a flow rate based on readings of the thermal mass flow sensor when the differential pressure is below the measurable differential.

25. The method of claim 24, wherein switching comprises switching between calculated flow rates automatically.

26. The method of claim 24, wherein switching comprises switching between calculated flow rates selectably.

27. The method of claim 14, and further comprising:
monitoring the averaging pitot tube element and thermal mass flow sensor of a flow measurement probe; and
providing a warning when one of the averaging pitot tube element and the thermal mass flow sensor element fails.

* * * * *